(12) United States Patent
Tolfa

(10) Patent No.: US 6,195,664 B1
(45) Date of Patent: Feb. 27, 2001

(54) METHOD AND SYSTEM FOR CONTROLLING THE CONVERSION OF A FILE FROM AN INPUT FORMAT TO AN OUTPUT FORMAT

(75) Inventor: Michael John Tolfa, North Richland Hills, TX (US)

(73) Assignee: Micrografx, Inc., Richardson, TX (US)

(*) Notice: Subject to any disclaimer, the term of this patent is extended or adjusted under 35 U.S.C. 154(b) by 0 days.

(21) Appl. No.: 08/804,487

(22) Filed: Feb. 21, 1997

(51) Int. Cl.[7] .................................................. G06F 17/30
(52) U.S. Cl. .......................... 707/200; 707/10; 707/100; 707/101; 707/203; 709/222; 713/324; 370/396; 379/220
(58) Field of Search ................................... 707/203, 204, 707/2, 3, 4, 5–8, 10, 100, 101, 102, 200; 703/15, 16, 23; 717/7, 9; 716/16, 17; 279/220; 375/240; 709/222, 223; 370/396; 713/324

(56) References Cited

U.S. PATENT DOCUMENTS

| | | | |
|---|---|---|---|
| 5,119,465 | 6/1992 | Jack et al. ................................ | 717/5 |
| 5,251,314 | 10/1993 | Williams ............................... | 707/101 |
| 5,379,376 | 1/1995 | Bednowitz ............................ | 345/501 |
| 5,390,320 | 2/1995 | Smithline ............................. | 703/20 |
| 5,448,496 | * 9/1995 | Butts et al. ............................ | 716/16 |
| 5,522,044 | * 5/1996 | Pascucci et al. ...................... | 709/222 |
| 5,598,566 | * 1/1997 | Pascucci et al. ...................... | 713/324 |
| 5,805,593 | * 9/1998 | Busche ................................. | 370/396 |
| 5,841,376 | * 11/1998 | Hayashi ................................ | 341/51 |
| 5,884,072 | * 3/1999 | Rasmussen .......................... | 709/223 |
| 6,061,692 | * 5/2000 | Thomas et al. ...................... | 707/200 |
| 6,084,858 | * 7/2000 | Matthews et al. ................... | 370/238 |
| 6,094,654 | * 7/2000 | Van Huben et al. ................. | 707/8 |

OTHER PUBLICATIONS

Ali, I. A. et al., "A dynamic routing protocol for broadband networks", Proceedings of the second IEEE Symposium on Computers and Communications, Jul. 1–3, 1997, pp. 495–500.*

Dean, Thomas, "Using Temporal Hierarchies to Efficiently Maintain Large Temporal Databases", Journal of the ACM, vol. 36, No. 4, Oct. 1989, pp. 687–718.*

Fujinkoi, Hiroshi et al., "The New Shortest Best Path Tree (SBPT) Algorithm for Dynamic Multicast Trees", Conference on Local Computer Networks, LCN '99, Oct. 18–20, 1999, pp. 204–211.*

Pierre, Samuel et al., "A Neural Network Approach for Routing in Computer Networks", IEEE Computer Conference on Electrical and Computer Engineering, May 24–28, 1998, pp. 826–829, Vol. 2.*

* cited by examiner

Primary Examiner—Hosain T. Alam
Assistant Examiner—Shahid Alam
(74) Attorney, Agent, or Firm—Baker Botts L.L.P.

(57) ABSTRACT

A system and method for controlling the conversion of a file from an input format to an output format is provided. The method includes a computer-implemented method for controlling the conversion of a computer file from an input format to an output format by determining the best path for converting the file from the input format to the output format using family objects. The method includes the steps of receiving the input format and the output format, and generating a node in memory for each family object that can read the input format. The method further includes the step of generating successful branches of nodes in memory that include one or more nodes such that each successful branch includes a first node that can read the input format and a last node that can write the output format. Finally, the method includes calculating a best path through the successful branches of nodes.

25 Claims, 8 Drawing Sheets

FIG. 2

| FIRST FAMILY OBJECT | | |
|---|---|---|
| READ | WRITE | QUALITY |
| A | | |
| B | B | 95% |
| C | C | 75% |
| D | D | 75% |

A — FAMILY OBJECT POINTER
B — NEXT NODE POINTER
C — PREVIOUS NODE IN BRANCH POINTER
D — DEPTH OF TREE
E — FILE FORMAT CONNECTING PREVIOUS NODE
F — DONE VARIABLE

26

FIRST NODE OF TREE

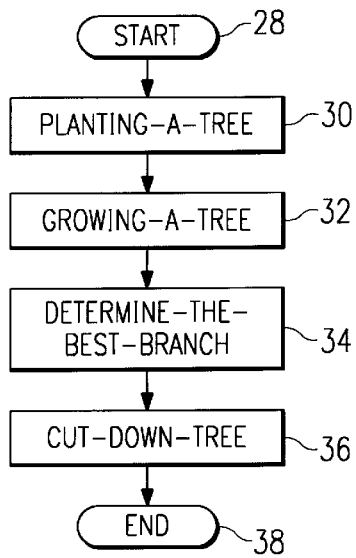

FIG. 4

START — 28
↓
PLANTING-A-TREE — 30
↓
GROWING-A-TREE — 32
↓
DETERMINE-THE-BEST-BRANCH — 34
↓
CUT-DOWN-TREE — 36
↓
END — 38

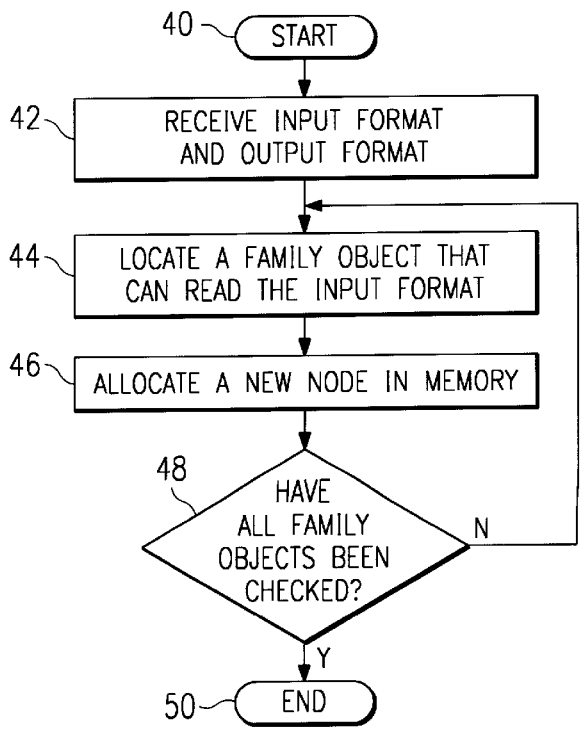

FIG. 5

40 — START
↓
42 — RECEIVE INPUT FORMAT AND OUTPUT FORMAT
↓
44 — LOCATE A FAMILY OBJECT THAT CAN READ THE INPUT FORMAT
↓
46 — ALLOCATE A NEW NODE IN MEMORY
↓
48 — HAVE ALL FAMILY OBJECTS BEEN CHECKED? — N (loop back)
↓ Y
50 — END

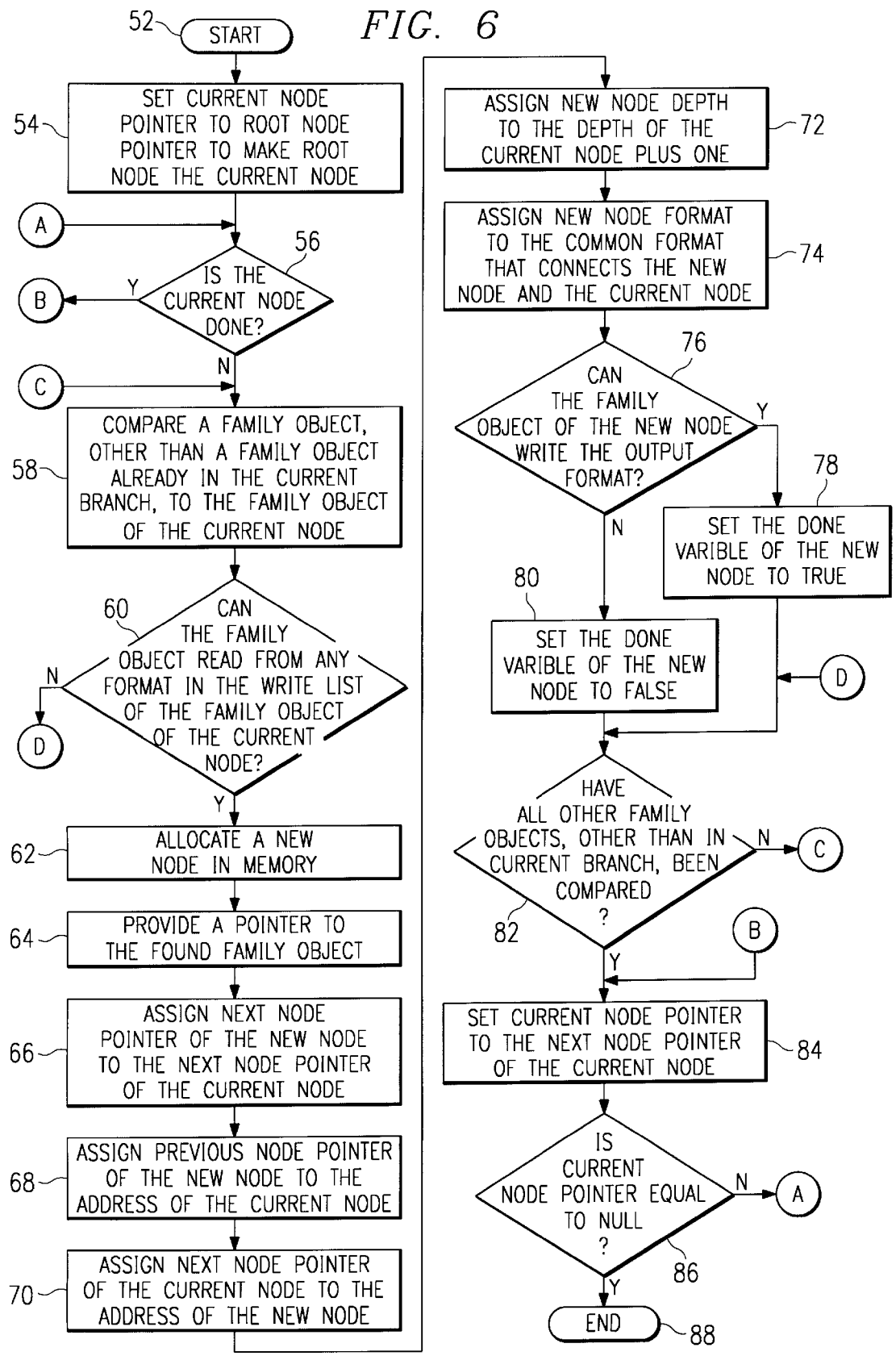

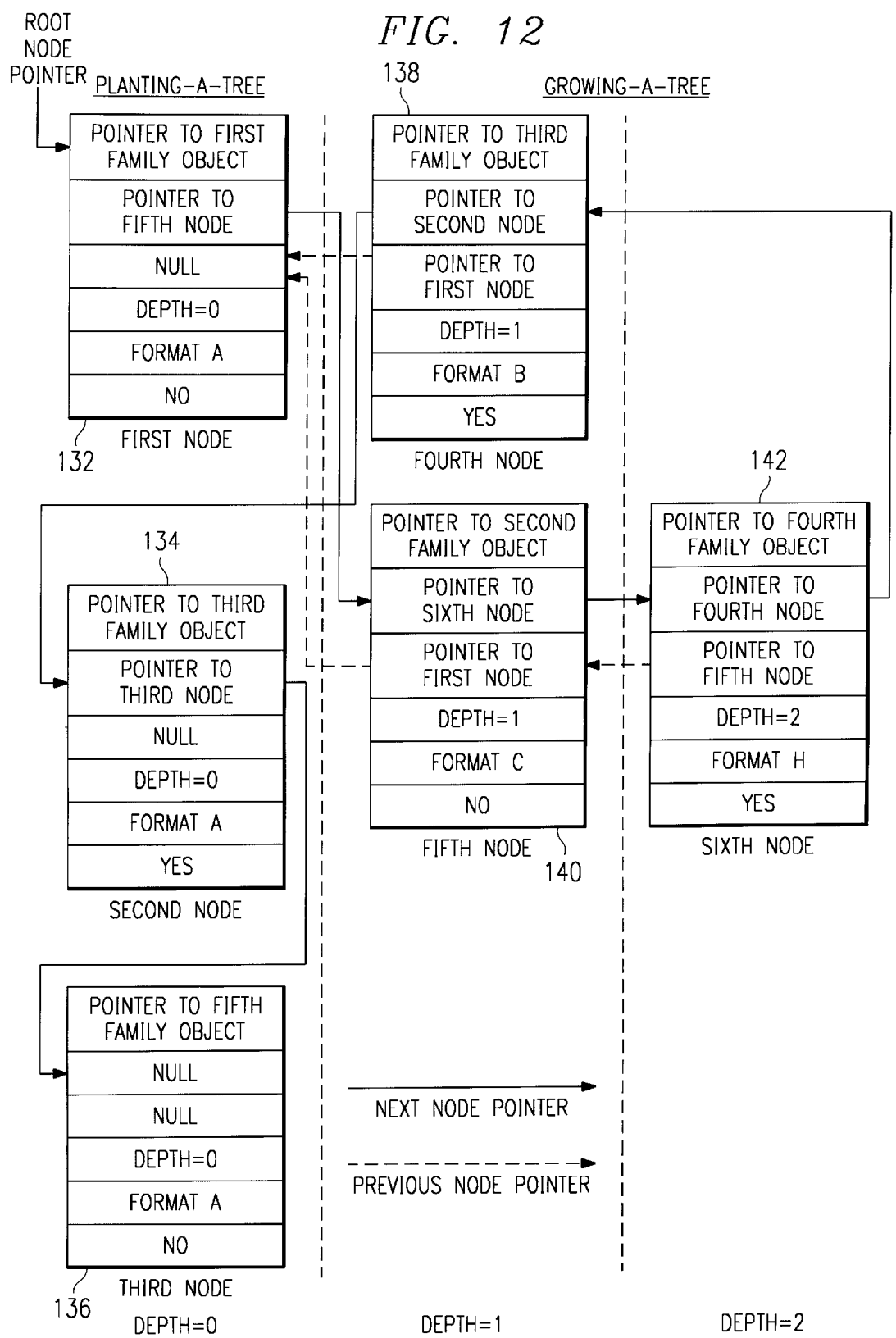

METHOD AND SYSTEM FOR CONTROLLING THE CONVERSION OF A FILE FROM AN INPUT FORMAT TO AN OUTPUT FORMAT

TECHNICAL FIELD OF THE INVENTION

The present invention relates generally to the field of information processing and more particularly to a system and method for controlling the conversion of a file from an input format to an output format.

BACKGROUND OF THE INVENTION

Computer graphics files are used to store graphical images which may be created, modified, and printed using a graphics program. The two basic types of computer graphics are object-oriented graphics, also referred to as vector graphics, and bit-mapped graphics, also referred to as raster graphics. Object-oriented graphics programs, usually called "draw" programs, store graphical images in the form of mathematical representations that can be sized and scaled without distortion. Object-oriented graphics are well suited for computer-aided design applications in which precision and scaling capability are most important. Bit-mapped graphics programs, often called "paint" programs, store graphical images in the form of patterns of screen pixels. Scanned graphical images, such as scanned photographs, are generally stored as bit-mapped graphics. Unlike object-oriented graphics files, bit-mapped graphics files may result in unacceptable distortion when resized or scaled.

Although there are two basic types of computer graphics, many different graphics file formats exist. Unfortunately, little standardization exists between the numerous graphics file formats. Many application programs generate graphics files in proprietary file formats that other programs can read only if specifically equipped to do so. Other graphics file formats are suitable or desirable for one purpose but may be less desirable for other applications. Thus, it is often desirable to convert a graphics file from one format to another format. The following non-exhaustive list contains the acronyms of some of the available graphics file formats: AI, BMP, CDR, CGM, CMX, DIB, DMK, DRW, DSF, DS4, DWG, DXF, EMF, EPS, FRM, GEM, GIF, HPGL, IGS, JAH, JBH, JPG, JSH, MGX, PCT, PCX, PHOTOCD, PLT, PNG, PP, PP4, PPF, PS, PSD, RAW, SCITEX, S3D, SUNRAS, TGA, TIF, WMF, and WPG.

In order to convert a graphics file from an input format to an output format, various conversion programs or translators have been developed. These graphics file conversion programs may be implemented as dynamic link libraries (DLLs), static link libraries, executable files, and the like. A family of conversion programs or translators may be grouped and referred to as a library family, a filter family, or a technology translator family. A family can convert a graphics file in one logical process.

A family may convert a graphics file from an input format to an output format. The translation of a graphics file from an input format to an output format may include the translation from a bit-mapped graphics file type to an object-oriented graphics file type and vice versa. Each family includes a predefined number of input graphics formats that the family is capable of reading and a predefined number of output graphics formats that the family is capable of writing. A family receives an input graphics file and generates an output graphics file stored in the desired format. It is often necessary to use more than one family to convert from an input file format to an output file format because one family may not be capable of both reading the necessary input format and generating the desired output format. Also, often there are multiple paths or routes that may be traversed to convert a graphics file from an input file format to a desired output file format. Often, one translation path will be better or more desirable than all other paths.

A non-exhaustive list of available library families includes the following: (1) ALDUS ImportGR Specification DLL Family; (2) INSO ImageStream Filters Family; (3) MGXRDR32.DLL MICROGRAFX Rendering Engine DLL Family; (4) PICTURE PUBLISHER Bitmap Libraries Family; and (5) VBORNDR.DLL Simply 3D Rendering Engine DLL Family. Each of these families may convert computer graphics files from an input format to an output format. For example, and as illustrated below, PICTURE PUBLISHER Bitmap Libraries Family may convert graphics files from any of the formats listed in the read list below to any of the formats listed in the write list below:

| Read List | Write List |
|---|---|
| BMP | BMP |
| DIB | DIB |
| DMK | DMK |
| FRM | FRM |
| GIF | GIF |
| JPG | JPG |
| PCX | PCX |
| PHOTOCD | PNG |
| PNG | PP |
| PP | PP4 |
| PP4 | PPF |
| PPF | PSD |
| PSD | SCITEX |
| RAW | SUNRAS |
| SCITEX | TGA |
| SUNRAS | TIF |
| TGA | |
| TIF | |

Other library families provide substantially fewer read and write format conversion options. For example, the MGXRDR32.DLL MICROGRAFX Rendering Engine DLL Family can convert files from any of the formats listed in the read list below to the WMF format listed in the write list

| Read List | Write List |
|---|---|
| DRW | WMF |
| DSF | |
| DS4 | |
| MGX | |

As mentioned above, it is often not possible to translate a graphics file directly from an input format to a desired output format using only one library family. Instead, multiple families must be used. However, certain translation paths are much more advantageous than other translation paths.

Prior attempts have been used to ensure that the most advantageous or "best" translation path is followed. Unfortunately, these prior techniques suffer serious drawbacks. One technique for determining the best translation path involves "hard" coding all of the best translation paths. This presents numerous problems. The table or database used to store all of the possible best translation paths requires significant memory, storage capacity, and often becomes unwieldy. Furthermore, whenever a new translator or library family becomes available, the table cannot be easily updated. The hard coded table is difficult to maintain, cumbersome, and inflexible.

The determination of the best path may depend upon what the user is trying to accomplish and how the user will use the output graphics file. For example, the user may be interested in such things as the speed of the conversion, the visual clarity of the conversion, the "editability" of the conversion, and the size of the converted file. The hard coded method makes it difficult to allow for such alternative best translation paths.

SUMMARY OF THE INVENTION

From the foregoing it may be appreciated that a need has arisen for a system and method for controlling the conversion of a file from an input format to an output format that eliminate or reduce the problems of prior techniques. In accordance with the present invention, a system and method for controlling the conversion of a file from an input format to an output format are provided which substantially eliminate the disadvantages and problems outlined above.

According to an embodiment of the present invention, a computer-implemented method for controlling the conversion of a computer file from an input format to an output format by determining the best path for converting the file from the input format to the output format using family objects is provided. The method includes various steps such as receiving the input format and the output format, and generating a node in memory for each family object that can read the input format. The method further includes the step of generating successful branches of nodes in memory that include one or more nodes such that each successful branch includes a first node that can read the input format and a last node that can write the output format. Finally, the method includes the step of calculating a best path through the successful branches of nodes.

The present invention provides various technical advantages. A technical advantage of the present invention includes the capability to quickly and accurately generate the best path or route to convert a file from an input format to an output format. Another technical advantage of the present invention includes the elimination of hard coded tables of all possible paths which is difficult to maintain, difficult to update, and requires large amounts of memory and storage space. Yet another technical advantage of the present invention includes the capability to allow a user to select a desired attribute or quality in which the best path is to be selected. For example, the present invention may allow a user to select from such attributes or qualities such as the speed of the conversion, the visual clarity of the conversion, the "editability" of the conversion, and the size of the converted file. Once the user selects a desired attribute or quality, the present invention may be used to calculate the best path to accomplish the user's desired attribute or quality. Often, the best path depends on the desired attribute or quality. The hard coded method makes it difficult to allow for such flexibility and features. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 2 is a block diagram illustrating an exemplary family object stored in memory;

FIG. 3 is a block diagram illustrating an exemplary data structure of a node that may be used in the present invention;

FIG. 4 is an overview flowchart illustrating the method for controlling the conversion of a file from an input format to an output format according to the teachings of the present invention;

FIG. 5 is a flowchart illustrating an exemplary method for performing a planting-a-tree process of the present invention;

FIG. 6 is a flowchart illustrating an exemplary method for performing a growing-a-tree process of the present invention;

FIG. 12 is a block diagram illustrating an example of the growing-a-tree process and the generation of a complete tree using the exemplary family objects of FIG. 9 and the earlier results of the growing-a-tree process as illustrated in FIG. 11.

DETAILED DESCRIPTION OF THE INVENTION

Figure 1:
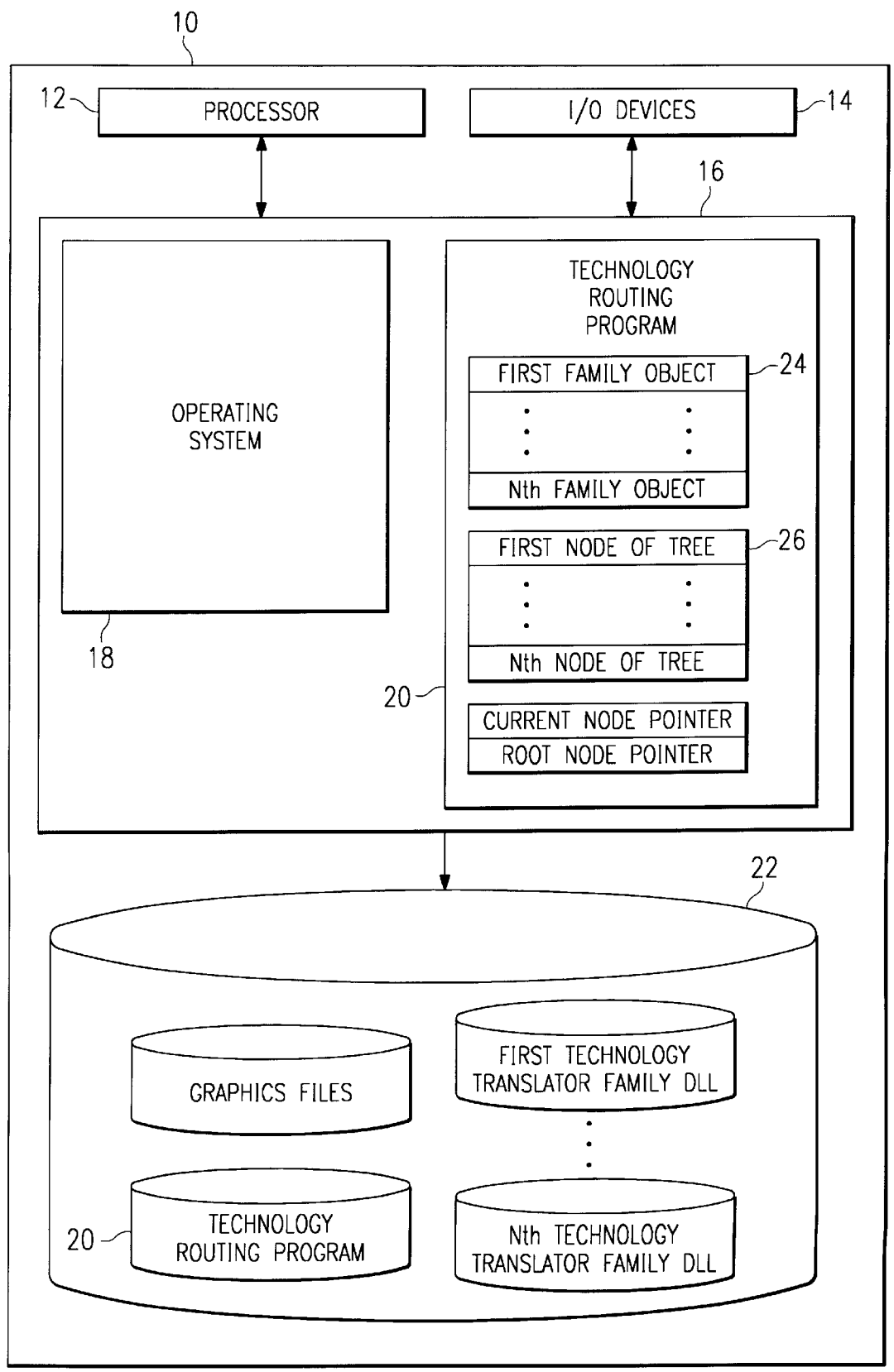
FIG. 1 is an overview block diagram illustrating a computer configured as a technology routing system for controlling the conversion of a file from an input format to an output format.

Turning first to the nomenclature of the specification, the detailed description which follows is represented largely in terms of processes and symbolic representations of operations by conventional computer components, including a central processing unit (CPU) or processor associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process or method is generally considered to be a sequence of computer-executed steps or instructions leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer or computers.

In addition, it should be understood that the programs, processes, methods, etc. described herein are but an example of one implementation of the present invention. The present invention is not limited to any one particular computer, apparatus or computer language. Rather, the present invention may be practiced using various types of general purpose computing machines or devices executing programs constructed in accordance with the teachings described herein. Similarly, it may prove advantageous to construct a specialized apparatus to perform the method steps described herein by way of dedicated computer systems with hardwired logic or programs stored in non-volatile memory, such as read only memory.

Referring now in more detail to the drawings, FIG. 1 is an overview block diagram illustrating a computer configured as a technology routing system 10 for controlling the conversion of a computer file from an input format to an output format. Technology routing system 10 includes a processor 12, I/O devices 14, a memory 16, and a mass storage device 22. Memory 16 is shown configured by an operating system 18 and a technology routing program 20. Similarly, mass storage device 22 is shown storing various computer files and programs such as graphics files, technology routing program 20, and a variety of technology translator families stored as DLLs. Technology routing system 10 may be implemented on virtually any computer such as a personal computer, a minicomputer, a work station, a server, a local area network, a mainframe computer, or any other computer capable of executing a computer program and manipulating computer files. It should be understood that although technology routing system 10 has been illustrated in FIG. 1 as a single computer, the present invention may be implemented on any type of computer system whether localized, distributed, or provided as part of a computer network.

Processor 12, under the control of operating system 18, is used to retrieve, process, store, and display data. Processor 12 communicates control, address, and data signals with operating system 18 and with the remaining components of technology routing system 10 through a system bus. Processor 12 may include an arithmetic logic unit used to assist processor 12 in performing mathematical operations. Processor 12 interprets and executes instructions that have been fetched or retrieved from memory 16, such as from technology routing program 20, and may be implemented as a single integrated circuit or as a combination of integrated circuits. Processor 12 may be implemented using virtually any available processor such as an INTEL or MOTOROLA microprocessor. Similarly, I/O devices 14 may be any peripheral that allows data to be exchanged with technology routing system 10 and may include such devices as a keyboard, a pointing device, a monitor, a graphics tablet, a modem, and the like. Memory 16 will generally be provided as random access memory (RAM), and the like. Mass storage device 22 may be any device capable of storing computer files such as a hard disk drive, a read/write compact disk, and the like. Operating system 18 may be provided as any available operating system such as WINDOWS, WINDOWS 95, WINDOWS NT, OS/2, DOS, and UNIX.

Technology routing program 20, along with operating system 18 may be provided to memory 16 from mass storage device 22. As illustrated, technology routing program 20 is shown stored within mass storage device 22. Technology routing program 20 may be provided as an executable file, a dynamic link library, and the like. Technology routing program 20 may use dynamic memory allocation techniques and initially establishes various data structures within memory 16. Initially, a set of family object data structures, such as a family object 24, are established to provide information corresponding to the available technology translator families, which are shown stored in mass storage device 22 as DLLs, that will be needed by technology routing program 20.

Technology routing program 20, during its operation, generates a tree or structure of all possible paths to convert a file, such as a graphics file, from an input format to an output format. The tree or structure includes nodes, such as a node 26, which are data structures formed within memory 16 as illustrated in FIG. 1. Each individual node or data structure will include information about a corresponding family object, and information linking the node to the previous node and next node of the tree. Technology routing program 20 will also include various pointers that are used throughout the execution of the program, such as a current node pointer and a root node pointer, as shown in memory 16.

During operation, operating system 18 is loaded into memory 16 during initialization or boot-up of technology routing system 10. Technology routing program 20 may then be loaded into memory 16, either automatically or after being selected by a user. Technology routing program 20 may, in a preferred embodiment, be loaded into memory 16 after a related application program, such as a graphics program, is loaded into memory 16. Technology routing system 10 receives an input from a user that includes an input file having an input file format and an output file format and determines the best path or route to convert the input file from the input format to the output format. The operation of technology routing program 20 will generally be transparent to the user and may result in the generation and deletion of various intermediate files that may be temporarily stored on mass storage device 22 or within memory 16. After determining the best path, other programs, not shown in FIG. 1, will be used to carry out the actual translation of the input file using the technology translator families identified in the nodes of the best branch. The input file may be a graphics file, such as those shown stored within mass storage device 22, and may be converted using the technology translators provided within mass storage device 22.

Technology routing program 20 may be implemented using any of a variety of computer programing languages and may provide a graphical user interface such as those used in WINDOWS compatible applications. For example, technology routing program 20 may be developed using the C++ programing language.

FIG. 2 is a block diagram illustrating a data structure of an exemplary family object 24, which is stored in memory 16 by technology routing program 20 as shown in FIG. 1. Family object 24 is provided as the first family object and includes information about a corresponding technology translator family, such as the first technology translator family DLL as shown in mass storage device 22 of FIG. 1. The information contained within family object 24 is used by technology routing program 20 when constructing the nodes of the tree which is used to determine the best path.

The exemplary data structure of family object 24 includes a read list, a write list, and a list of quality factors. The read list includes the formats that the associated first technology translator family is capable of receiving and reading as an input file format. The write list includes the output formats that the associated first technology translator family is capable of writing as an output file format. The list of quality factor percentages is provided to indicate the quality of the translation to the associated write format. For example, to convert a file stored in any of the read formats to the "B" output file format, the associated quality factor is ninety-five percent, while the quality factor associated with converting a file stored in any of the read formats to the "C" output file format is seventy-five percent. The quality factors are used by technology routing program 20 to determine the best branch after all possible branches of the tree have been constructed. It should be understood that the implementation of the quality factors may be provided in a variety of formats. For example, a quality factor may be provided for each and every possible translation from an input format to an output format or quality factors could be associated with each input format that the family object is capable of reading.

The assignment of the quality factors is generally provided by the program designer and may be updated by a system administrator or the like. The quality factors correspond to whatever attribute or quality that is desired. For example, the desired attribute or quality may be the speed of translation from one format to another format, the visual clarity of the translated file, the editability of the translated file, or any of a variety of other factors. In an alternative embodiment of family object 24, multiple quality factors are provided for each desired attribute or quality such that a user may initially select the desired attribute or quality and technology routing program 20 will determine the best path using the quality factors associated with the desired attribute or quality.

FIG. 3 is a block diagram illustrating an exemplary data structure of node 26 according to the teachings of the present invention. As the tree is constructed by technology routing program 20 to provide all possible paths or branches of converting the desired input format to the desired output format, each potential translation is modeled in memory 16 using a node structure, such as that provided by node 26.

The exemplary data structure provided by node 26 includes fields A through F. The fields may also be referred to as variables or data sub-structures. Field A includes a pointer to the associated family object that was previously provided within memory 16 by technology routing program 20. Field B includes a pointer or address to the next node in the tree. Field C includes a pointer or address to the previous node in the current branch of the tree. The pointer of field B may be referred to as a next node pointer or a forward pointer, while field C may be referred to as a previous node pointer or a backward pointer.

Node 26 further includes a field D which may be referred to as a depth variable or level variable that indicates the depth or level where the node was formed.

For example, referring ahead to FIG. 12, a complete tree is illustrated with three depths or levels shown. The first depth being provided at depth zero and the last depth or level being provided at depth two. Node 26 also includes a field E which includes the file format that is the common format between the current node and the previous node. For example, if a previous node can write the format "Q" and the current node can read in the format Q, the connecting format between the two nodes may be the Q format. Field E will include the input file format when the node is generated at a depth equal to zero. When the depth is equal to zero, no previous node exists. Finally, node 26 may include a field F which indicates whether the current node can write the output format desired by the user. This may be referred to as a "done" variable and answers the question of whether the family object associated with node 26 can write the output format desired by the user. If so, the current branch of the tree will be complete because a successful node was found.

FIG. 4 is an overview flowchart illustrating the method for controlling the conversion of a file from the input format to the output format according to the teachings of the present invention. The method begins at step 28 and proceeds to step 30 which may be referred to as the planting-a-tree process. The planting-a-tree process involves developing the first depth or level of nodes of the tree. An example of the results of the planting-a-tree process is illustrated in FIG. 12. The nodes provided in the first column all have their depth variables set equal to zero and hence are within the first depth or level of the tree.

Step 30 or the planting-a-tree process involves locating all available family objects, stored in memory 16, that include the input format in their read list, thus making them capable of reading the input file format. A corresponding node is generated for each of these family objects. The first node that is generated in the planting-a-tree process is referred to as the root node. The planting-a-tree process is illustrated more fully in FIG. 5 and discussed more fully below.

The method proceeds next to step 32 where the tree is grown in the growing-a-tree process. The growing-a-tree process involves generating all of the possible branches, both successful and unsuccessful, beginning with the root node generated in the planting-a-tree process. In general, the growing-a-tree process involves examining the write list of an existing node and finding all possible family objects, other than family objects already within the current branch, that can read any of the formats provided in the write list of the node. As family objects are located, additional nodes are formed until either a family object is located that can write the desired output format or all possibilities are exhausted. As a result, successful branches of nodes are generated that include a last node that is capable of writing the desired output format while unsuccessful branches of nodes are also generated which include a last node which is not capable of writing the output format. An example of a successful branch is illustrated by a first node 132, a fifth node 140, and a sixth node 142 of FIG. 12. An illustration of a one node, unsuccessful branch is illustrated by a third node 136 of FIG. 12.

The growing-a-tree process also generates both the next node pointers and previous node pointers as illustrated in the nodes and arrows of FIG. 12. The next node pointer or forward pointer includes a contiguous path beginning at the root node and ending at a final node. For example, third node 136 of FIG. 12 serves as the final node of the contiguous forward pointer path. The previous node pointer or backward pointer provides a path from the last node in a branch to the first node in a branch, which will include a node that was generated during the planting-a-tree process. For example, a previous node pointer path exists from sixth node 142, to fifth node 140, and to first node 132 to provide a complete successful branch path as illustrated in FIG. 12. The growing-a-tree process is discussed more fully below and an exemplary method for performing the process is illustrated in FIG. 6.

The method proceeds next to step 34 where the best branch is located after the tree has been completely grown. Step 34 may be referred to as a determine-the-best-branch process. Briefly, this process involves traversing all successful branches and sequentially multiplying the quality factors of each node of each successful branch that is provided in a given branch. As a result, the highest branch quality factor is located and thus the best branch is identified. An exemplary method for determining the best branch is illustrated more fully in FIG. 7 and is discussed more fully below.

Next, the method proceeds to step 36 where the memory allocated to store the tree structure is discarded so that additional memory may be available to the system. The process of freeing additional memory is referred to as the cut-down-tree process as mentioned in FIG. 4. Generally, this process involves starting at the root node and traversing through the entire tree sequentially using the next node pointers or forward pointers which provide a contiguous link through the entire tree. Before the tree is cut down, the relevant information relating to the best branch is extracted from memory and provided to a translation utility so that the actual file translations may be performed using the technology family translator libraries using the formats identified in the nodes of the best branch. Step 38 signifies the end of the method.

FIG. 5 is a flow chart illustrating an exemplary method for performing the planting-a-tree process of the present invention. The method begins at step 40 and proceeds to step 42 where an input file format and an output file format are received. The input file format may be directly provided by a user or provided by entering a file name, including a file extension name. Whenever a file name is provided as an input, the input format will be assumed to be the format designated by the file extension name. The method proceeds next to step 42 where a family object is located that can read the input format. This is accomplished by searching the read list of all the various family objects that are provided within memory. Once a family object is located that can read the input format, the method proceeds to step 46.

Step 46 involves allocating a new node in memory. As mentioned above, the first node allocated during the planting-a-tree process is referred to as the root node. When allocating a new node, a portion of memory is reserved to store the contents of the new node and the various data that will populate the fields of the new node. The structure of the new node may be similar to the exemplary data structure provided by node 26 of FIG. 3. The new node will contain a pointer to the family object that contains the input format within its write list. A next node pointer will not be available at this time and therefore will be stored as a null value until such next node is generated. The value of the previous node pointer will be set to a null value since all nodes generated in the planting-a-tree process will not include a previous node pointer since they are the first node in every branch. The previous node pointer is later used to traverse each branch of the tree. The depth of the tree variable will be stored in the new node and will be stored at a depth equal to zero. A file format corresponding to the input format will be stored in the new node along with the done variable, which indicates the whether the family object associated with the new node is capable of writing the output format. If the family object is capable of writing the output format, the present branch is indicated to be done.

The method proceeds next to decision step 48 where it is determined whether all of the family objects have been checked to ascertain whether the family object is capable of reading of the input format. If all of the family objects have not been checked, the method proceeds back to step 44. If all of the family objects have been checked, the method proceeds to step 50 where the method ends.

It should be noted that whenever the method proceeds from decision step 48 to step 44 and another family object is located, a new node is allocated. As a consequence, the previously generated new node will have its next node pointer updated so that the previously generated new node will include a pointer to the address of the most recently allocated new node. It should also be understood that various pointers will generally be used, such as a current node pointer, during the execution of the planting-a-tree process. The current node pointer will generally point to the current node in memory. Finally, the last new node that is allocated will include a null value for both its next node pointer and previous node pointer. This occurs because neither of these are applicable to the last node allocated during the planting-a-tree process.

FIG. 6 is a flow chart illustrating an exemplary method for performing the growing-a-tree process of the present invention. The method begins at step 52 and proceeds next to step 54 where the current node pointer is set to the root node pointer so that the root node is now the current node. The method proceeds to decision step 56 where the done variable of the current node is analyzed to determine if the current node is capable of writing the output file format. If so, the method proceeds to step 84 and will be discussed more fully below. If the current node cannot write the output format, the method proceeds to step 58 where the family object of the current node is compared to a family object other than a family object already in the current branch. The comparison of step 58 proceeds until a family object is located that is not already in the current branch. The method then proceeds to decision step 60.

Decision step 60 involves analyzing the family object located in step 58 with the family object of the current node. The write list of the family object of the current node is compared to the read list of the located family object. The comparison is used to determine if the located family object can read any of the file formats that the current node can write. As soon as a common format is located, the method proceeds to step 62. If a common format cannot be located, decision step 60 proceeds to decision step 82 which will be discussed in more detail below.

Proceeding next to step 62, a new node will be allocated in memory. The allocation of the new node proceeds similarly to the allocation of a new node in memory as previously described with respect to step 46 of the planting-a-tree process of FIG. 5. The method proceeds next to step 64 where a pointer is stored in the new node that points to the address of the located family object. The method then proceeds to step 66 where the next node pointer is assigned a value equivalent to the next node pointer of the current node. Remember, the current node is the node located at the address stored in the current node pointer.

Next, the method proceeds to step 68 where the previous node pointer of the new node is assigned the address of the current node, which should be the value in the current node pointer. The method proceeds next to step 70 where the next node pointer of the current node is assigned the address of the new node that was just allocated. In this manner, the current node will include a next node or forward pointer to the new node just allocated while the new node includes a previous node pointer back to the address of the current node. In this manner, the next node pointer will continue to be a contiguous pointer throughout the tree and the previous node or backward node pointer will continue to provide a backward path through each branch of the tree.

The method proceeds next to step 72 where the structures or variables of the new node continue to be populated. The depth of the tree variable is assigned a value equivalent to the depth of the current node plus one. Assuming that the previous node was provided when the depth was equal to zero, the depth of the new node will be assigned a value of one. Next, the file format variable connecting the new node to the current node is stored in the new node data structure. Once again, the format will be the file format that was located in decision step 60 that indicated that the family object associated with the new node was capable of reading a file format that the family object of the current node could write.

Proceeding next to decision step 76, the method determines whether the family object of the new node can write the output format. If so, the method proceeds to step 78 where the done variable is set to true indicating that the new node can write the output format and thus ending current branch. If not, the method proceeds to step 80 where the done variable of the new node is set to false.

The method continues at decision step 82 where it is determined whether all other family objects, not in the current branch, have been compared to the write list of the current node. If no, the method proceeds back to decision step 58 so that additional nodes, at the same depth or level, may be generated if additional family objects are found to be capable of reading from the write list of the family object associated with the current node. This is illustrated in FIG. 12 by referring to a fourth node 138 and fifth node 140. Once fourth node 138 is generated by the growing-a-tree process, the fifth node may then be generated by transitioning from decision step 82 to step 58 of the current method. If all family objects other than the family objects in the current branch have been compared, the method proceeds to step 84.

It should be noted that another entry into decision step 82 is provided from decision step 60 as mentioned previously. Decision step 60 determines whether a family object can read any format from the write list of the current family object. If a family object cannot, the method proceeds to decision step 82 where it is determined whether additional family objects need to be compared.

Referring next to step 84, the current node pointer is set to the next node pointer of the current node. This allows another depth or level to be generated. The path into step 84 may proceed from the yes branch of decision step 82 or from the yes branch of decision step 56. Once again, decision step 56 determines whether the done variable of the current node is set to true. If it is, the current branch is done and thus there is no need to generate additional nodes from the current node. Thus, the current node pointer is assigned to the address of the next node pointer of the current node as illustrated in step 84.

Finally, the method proceeds to decision step 86 where it is determined whether the current node pointer is equal to null. This indicates whether the last or final node in the entire tree has been accessed. This may be illustrated by referring to FIG. 12 and noting that the third node, which is the final node in the entire tree, includes a null value in the next node pointer variable or structure. Thus, whenever the current node pointer is assigned to the next node pointer of the current node in step 84, the current node pointer will be assigned a null value thus indicating the end of the growing-a-tree process. If so, the method proceeds to step 88 where the method ends. If not, the method proceeds back to decision step 56 where attempts are made to generate additional new nodes from the current node. Once the tree is completely constructed, the best path must be determined.

Figure 7:
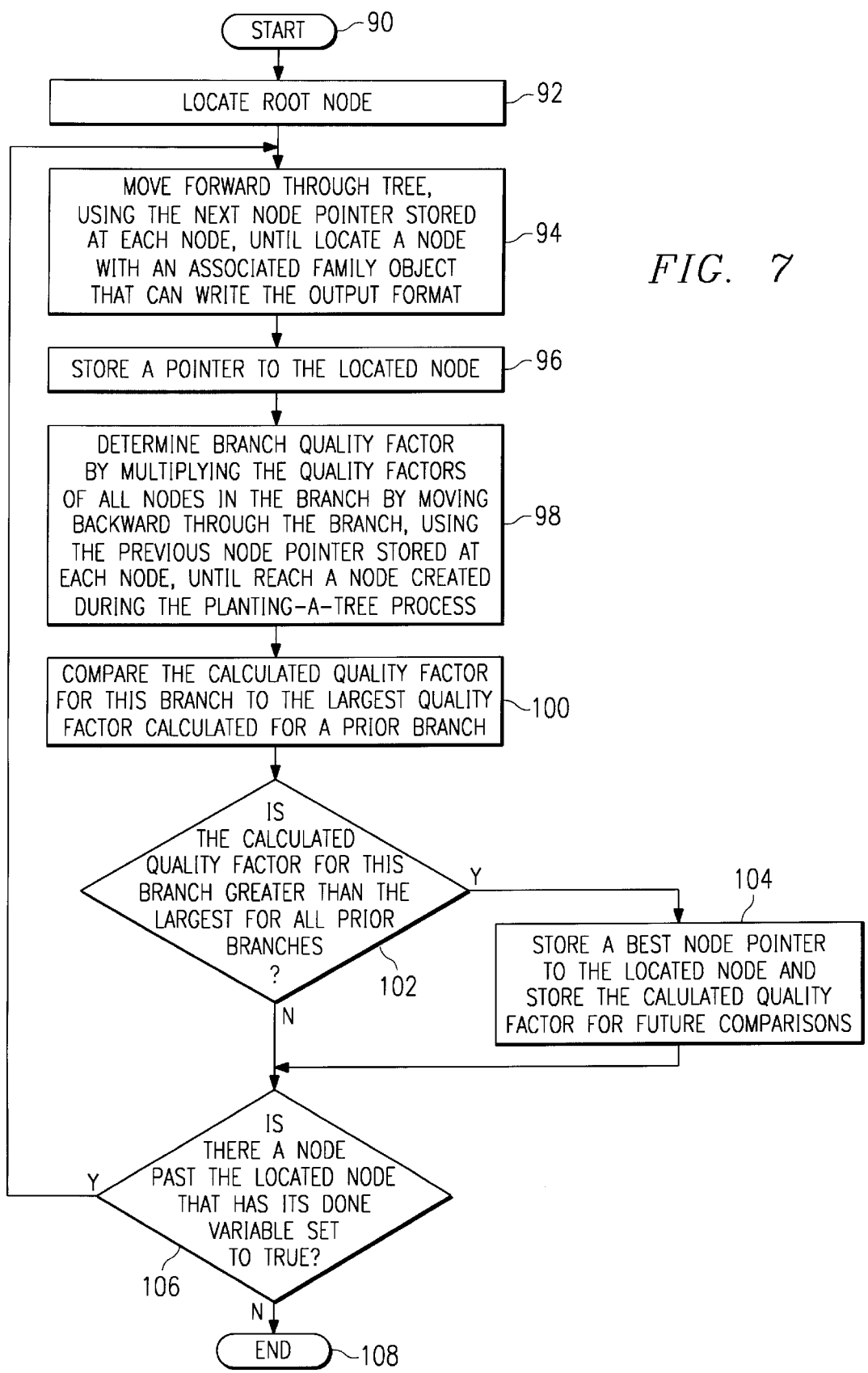
FIG. 7 is a flowchart illustrating an exemplary method for performing a determine-the-best-path process of the present invention.

FIG. 7 is a flow chart illustrating an exemplary method for performing the determine-the-best-path process according to the teachings of the present invention. The method begins at step 90 and proceeds to step 92 where the root node is located. Once again, the root node is the very first node established in the growing-a-tree process. The method proceeds next to step 94 where a branch of the tree is traversed by moving through the tree using the next node pointer stored at each node. The movement forward continues until a node is located with an associated family object that can write the output format. This indicates the end of a branch. This may be indicated by reading the done variable. At such time, a pointer is stored at the located node as shown in step 96. This serves as a reference pointer so that once the quality factor is generated for the current branch is calculated, the determine-the-best-path process may continue at this point to locate the next successful branch.

The method proceeds next to step 98 where the branch quality factor of the current branch is determined by accessing the quality factor of each successive node in the branch and multiplying these values together. The successful branch may be traversed backwards using the previous node pointer which provides a complete path from the last node in a branch to the first node in a branch, which will be a node created during the planting-a-tree process. The quality factor of each node may be established in a variety of ways. For example, and as illustrated in FIG. 2, a quality factor may be provided for each write format type. Thus, the quality factor for each node will correspond to the format type that the node is attempting to write. This may be determined by looking at the format connecting variable of the next node. This may be provided at the last node in a branch by using the output format as the write format. However, it should be understood that a variety of techniques could be used to establish or assign quality factors and the present invention is not limited to any one particular technique or method of assigning quality factors.

The method next proceeds to step 100 where the calculated quality factor for a branch is compared to the largest branch quality factor calculated for a prior branch. The method then proceeds to step 102 where it is determined whether the calculated quality factor for the current branch is greater than the largest branch quality factor of all prior branches. If so, the method proceeds to step 104 where the value of the current branch quality factor is stored and the located node, stored in step 96, is stored in a best node pointer. Thus, after all branch quality factors have been calculated, the best branch, or the branch having the highest quality factor in this case, will be stored and the associated address of the last node of the best branch will be available to locate the best branch.

The method proceeds next to step 106 from step 104 and from the no branch of decision step 102. Decision step 106 involves determining whether additional successful branches exist in the tree. This may be determined by further traversing the tree to determine if additional nodes can be found that have their done variable set to true. This indicates that additional successful branches are present. If additional successful branches are located, the method proceeds back to step 94 so that the quality factor may be calculated for each additional successful branch. It should be noted that in step 94 the movement forward begins from the located node that was previously stored in step 96. If all successful branches have been found, the method ends at step 108.

At such time, the best node pointer will contain the address of the last node of the best branch. All the information needed to actually execute the associated technology translator families may then be provided to another routine so that the input file may be actually converted from the input format to the output format using the best path.

Figure 8:
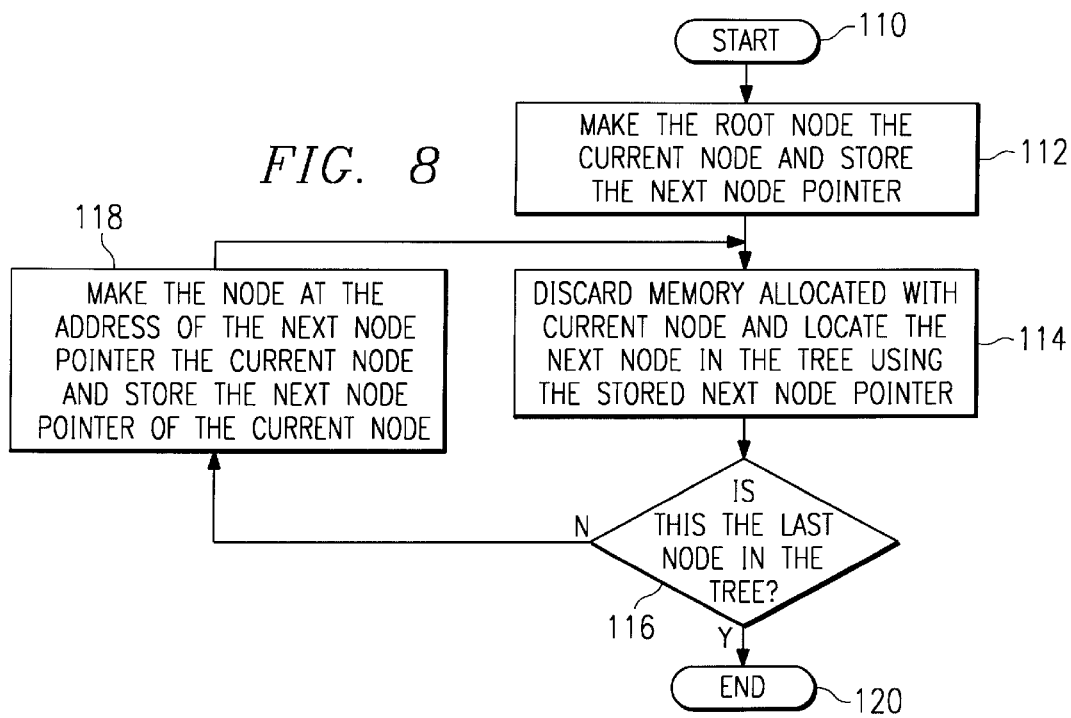
FIG. 8 is a flowchart illustrating an exemplary method for performing a cut-down-tree process of the present invention.

FIG. 8 is a flow chart illustrating an exemplary method for performing the cut-down-tree process of the present invention. The method begins at step 110 and proceeds to step 112 where the root node is located which serves as the current node. The next node pointer of the root node is then stored and the method proceeds to step 114.

The memory allocated to the current node is then discarded and the next node in the tree is located using the next node pointer stored in step 112. Decision step 116 is provided to determine whether the last node in the tree has been discarded. This may be determined by analyzing the next node pointer to determine if a null value is present. If not, the method proceeds to step 118 where the node at the address of the next node pointer is provided as the current node and the next node pointer of the new current node is stored. The method then proceeds back to step 114 and continues. If the last node in the tree was reached, decision step 116 proceeds to step 120 where the method ends.

Figure 9:
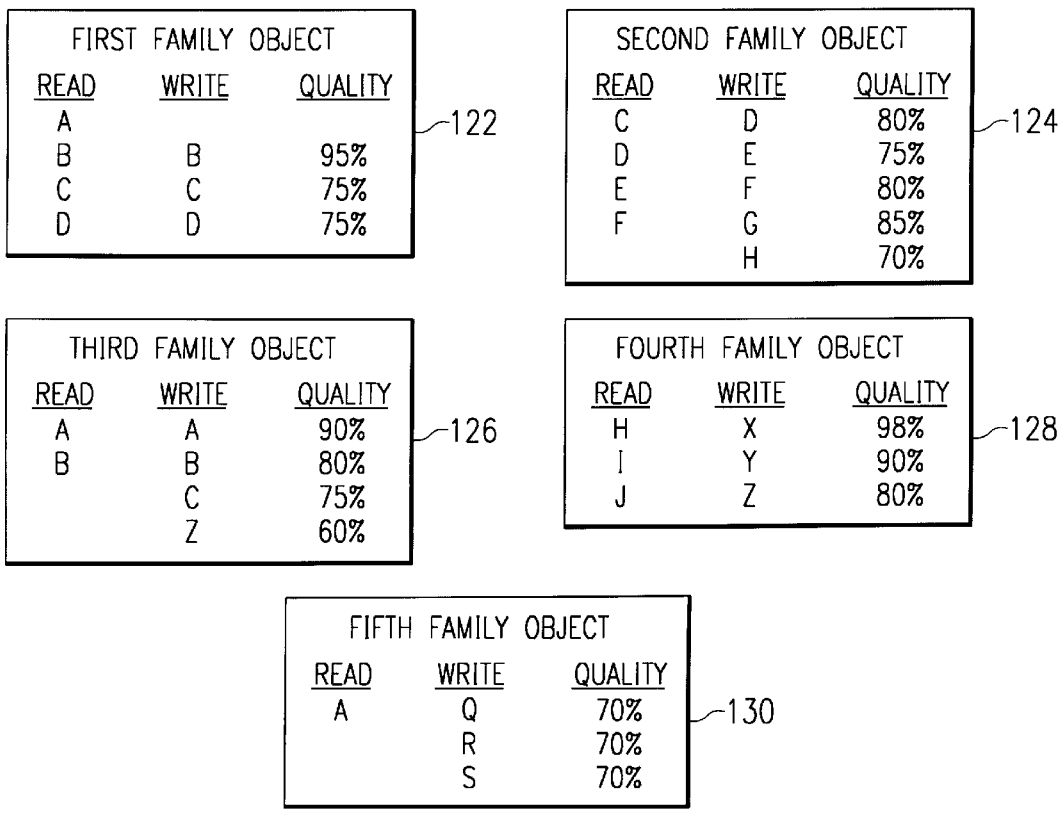
FIG. 9 is a block diagram illustrating exemplary family objects that may be used in the present invention.

FIG. 9 is a block diagram illustrating exemplary family objects that may be used in the present invention. The exemplary family objects include first family object 122, second family object 124, third family object 126, fourth family object 128, and fifth family object 130. These family objects are used in an example illustrating the planting-a-tree process, the growing-a-tree process, the determine-the-best-branch process, and the cut-down-tree process of the present invention and illustrated in FIGS. 10 through 12.

First family object 122 may read formats A, B, C, and D and may write the formats B, C, and D. The quality factors associated with the write formats are shown to the right of the write list of first family object 122. The formatted structure of the remaining family objects are the same as first family object 122 and the relevant read lists, write lists, and quality factors are as shown in FIG. 9.

Figure 10:
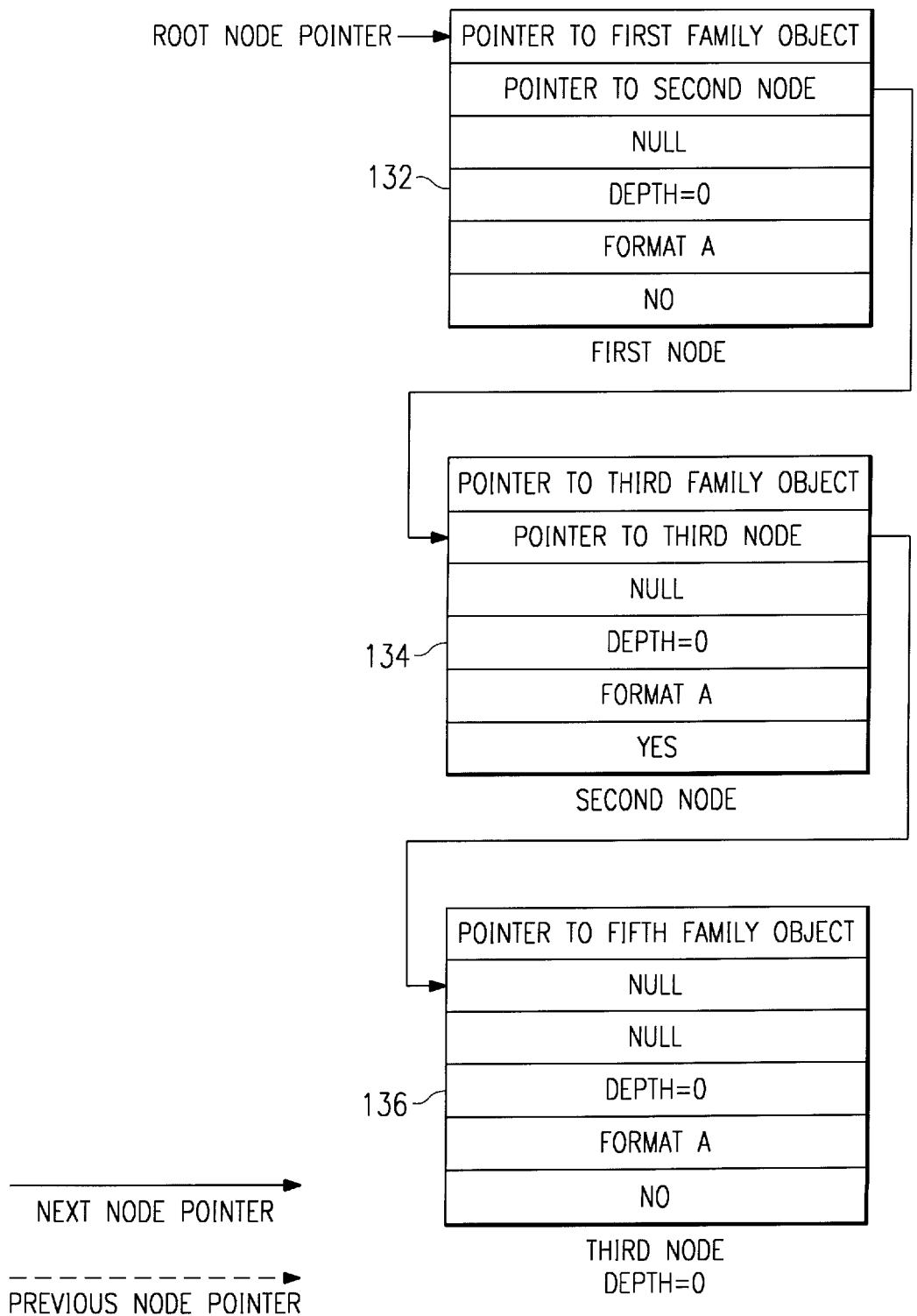
FIG. 10 is a block diagram illustrating an example of the planting-a-tree process using the exemplary family objects of FIG. 9.

FIG. 10 is a block diagram illustrating an example of the planting-a-tree process using the exemplary family objects of FIG. 9. The input format corresponds to the format A while the output format corresponds to the format Z.

The planting-a-tree process begins by receiving the input format A and the output format Z and proceeds next to locating a family object that can read input format A. Referring to FIG. 9, the first family object that can read the input format A is first family object 122. As a consequence, a new node is allocated in memory and is illustrated by a first node 132 of FIG. 10. Because this is the first node created in the entire tree, this node will be referred to as the root node and a root node pointer will be stored pointing to the address of first node 132. As illustrated, first node 132 includes a pointer to the first family object and a pointer to the second node which will not be stored until the second node is established as discussed more fully below. First node 132 also includes a null value stored in the previous node in branch pointer since there cannot be a previous node to any node generated during the planting-a-tree process. First node 132 also sets the depth of tree variable to zero since this is the first level or depth of the tree that will be constructed.

First node 132 also includes the format A as the file format connecting the previous node. Since there is not a previous node, the input format serves as the previous node connecting format for the nodes generated during the planting-a-tree process. Finally, the done variable of first node 132 is set to no since the write list of first family object 122 cannot write the format Z.

The planting-a-tree process continues searching each of the available family objects to locate a family object that can read the input format A. As a consequence, second node 134 is generated with a pointer to third family object 126 as shown in FIG. 9. The remaining variables of second node 134 are generated as described above with respect to first node 132. However, since third family object 126 can write the output format Z, the done variable is set to yes. Also, as mentioned above, the next node pointer of first node 132 is now set to second node 134 since the address of the next node is now known.

Finally, the planting-a-tree process continues until the final family object is located that can read the input format A. As a consequence, third node 136 is generated and the corresponding variables are established. Third node 136 corresponds to fifth family object 130 as illustrated in FIG. 9. Also, the next node pointer of second node 134 is set to point to the third node. Significantly, both the next node pointer and previous node pointer of third node 136 are set to the null value since no previous node is available and a next node has not been generated. The solid arrow of FIG. 10 illustrates the next node pointer and the dotted-line arrow illustrates the previous node pointer, which is non-existent in the nodes generated during the planting-a-tree process.

Figure 11:
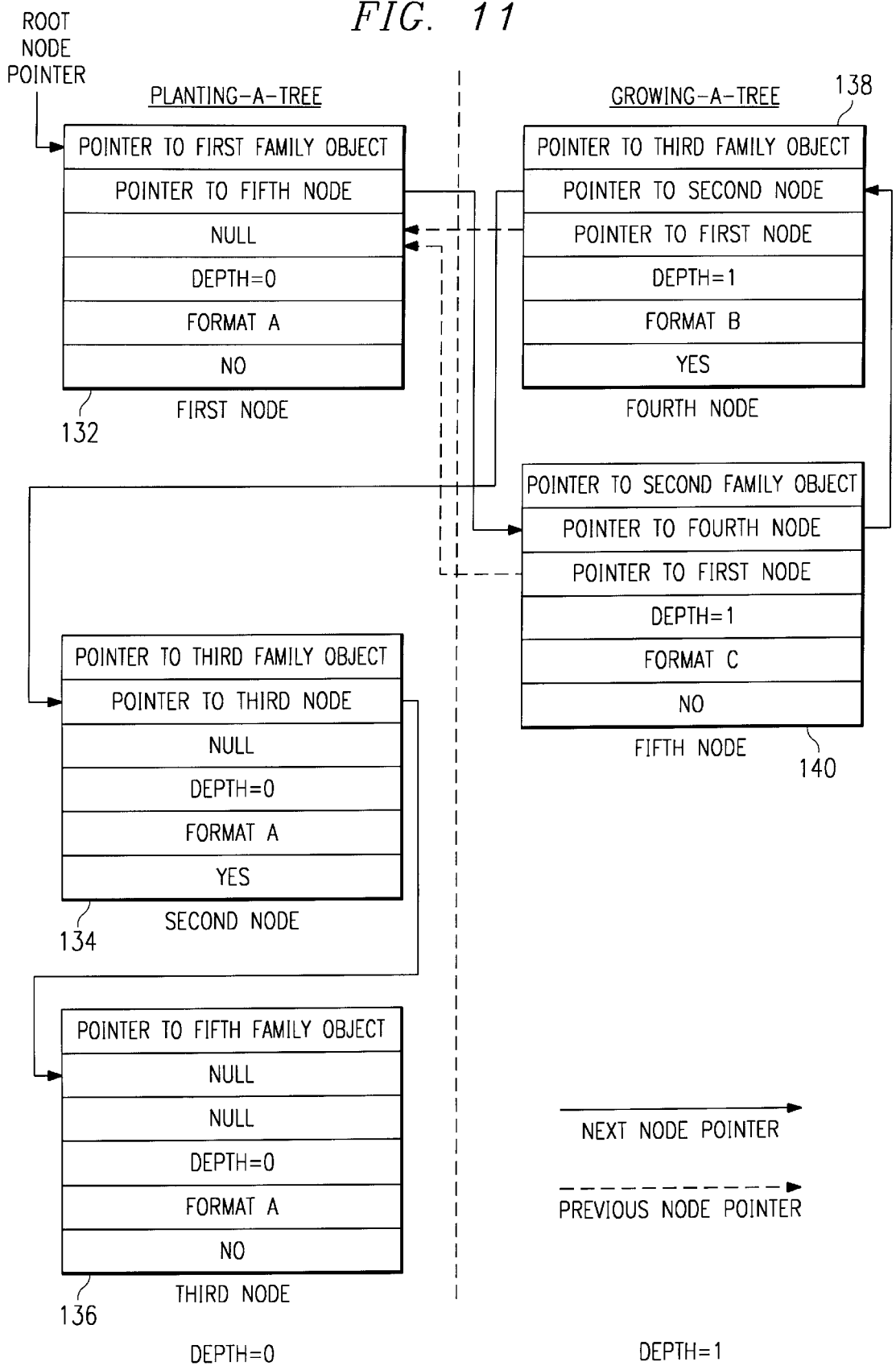
FIG. 11 is a block diagram illustrating an example of the growing-a-tree process and the generation of a first depth using the exemplary family objects of FIG. 9 and the results of the planting-a-tree process as illustrated in FIG. 10.

FIG. 11 is a block diagram illustrating an example of the growing-a-tree process in the generation of a first depth or level using the exemplary family objects of FIG. 9 and the results of the planting-a-tree process as illustrated in FIG. 10 and described above. FIG. 11 illustrates the development of a fourth node 138 and a fifth node 140. The growing-a-tree process begins by setting the current node pointer to the root node pointer and making first node 132 the current node. Next, the current node is checked to determine whether the done variable is set to yes. In this case, first node 132 cannot write format Z therefore the done variable is set to no.

Next, the write list of first family object 122 is examined and compared to the read list of all other available family objects that are not in the current branch in an attempt to locate any family object that can read any of the formats that can be written by first family object 122. Initially, third family object 126 is located since third family object 126 can read format B. As a result, a node is allocated and generated in response. This node is shown in FIG. 11 as a fourth node 138. Fourth node 138 includes a pointer to third family object 126 and will assign its next node pointer to the next node pointer stored in the current node, which is first node 132. As a result, the next node pointer of fourth node 138 is set to second node 134. Fourth node pointer 138 also includes a previous node pointer that is set to the address of the current node, which in this case is first node 132. This is illustrated by the illustrated by the dotted-line arrow from fourth node 138 to first node 132. Next, the next node pointer of first node 132 is assigned the value of the address of fourth node 138. Thus, first node 132 now includes a next node or forward pointer to fourth node 138. This is not shown in FIG. 11 because the later generation of a fifth node 140 changes this step. The depth variable is next set to one level greater than the depth of the current node. The file format connecting fourth node 138 to first node 132 is format B and is stored in fourth node 138. The done variable of fourth node 138 is set to yes because third family object 126 can write the output format Z.

The remaining family objects are searched to find additional family objects that can read any of the formats that first family object 122 can write. Second family object 124 is located since second family object 124 can read format C and first family object can write format C. As a consequence, fifth node 140 is generated and a pointer to second family object 124 is stored in fifth node 140. A next node pointer, pointing to fourth node 138, is stored in fifth node 140 since first node 132 previously pointed to fourth node 138 in its next node pointer. The previous node pointer is then set to point to first node 132 which is the current node. Also, the next node pointer of first node 132 is set to point to the address of fifth node 140 as shown by the solid arrow in FIG. 11. The generation of fifth node 140 is the last node generated for the depth equal to one level of the growing-a-tree process.

FIG. 12 is a block diagram further illustrating the example of the growing-a-tree process in the generation of a complete tree using the exemplary family objects of FIG. 9 and the earlier results in the growing-a-tree process as illustrated in FIG. 11. FIG. 12 illustrates the development of a sixth node 142 which concludes the generation of the entire tree. At this stage in the growing-a-tree process, the current node pointer is set to point to the next node pointer of the current node. In this case, the next node pointer of first node 132 points to fifth node 140 and thus the current node is now fifth node 140.

The growing-a-tree process next attempts to find any available family objects that can read any of the formats that may be written by second family object 124 of fifth node 140 that are not already in the current branch. The only family object meeting this criteria is fourth family object 128 of FIG. 9. Second family object 124 and fourth family object 128 share the format H. As a result, a pointer is stored within sixth node 142 that points to fourth family object 128. The next node pointer of sixth node 142 is set to point to fourth node 138, which the next node pointer of fifth node 140 previously pointed towards. The previous node pointer of sixth node 142 points to fifth node 140 while the next node pointer of fifth node 140 now points to sixth node 142. The depth of sixth node 142 is then set to two and the connecting format is set to format H. The done variable is set to yes since fourth family object 128 can write the output format Z.

The growing-a-tree process then sets the current node pointer to fourth node 138 since the next node pointer of sixth node 142 points towards fourth node 138. The growing-a-tree process then determines that fourth node 138 is the last node in the branch since the fourth node can write the output format Z. The growing-a-tree process then proceeds to set the current node pointer to the second node 134 which is also the last node, and first node, in a branch since third family object 126 of second node 134 can write the output format Z. Next, the current node pointer then points towards third node 136.

Third node 136 is associated with the fifth family object 130. Fifth family object 130 can write the formats Q, R, and S. No other family object in the present example is capable of reading in any of the formats that fifth family object 130 is capable of writing. As a consequence, the branch defined by third node 136 is a one-node branch that is deemed an unsuccessful branch because the last node in the branch cannot write the output format Z. The growing a tree process subsequently ends because there are no additional nodes to grow since the next node pointer of third node 136 contains the null value.

Now that the tree has been fully grown, the determine-the-best-branch process may proceed. The determine-the-best-branch process includes starting at first node 132, which serves as a root node, and proceeding forward using the next node pointers until a node is located that can write the output format Z.

As a result of following these steps, sixth node 142 is located and a pointer is stored to the address of sixth node 142. Next, the branch quality factor is calculated by multiplying the quality factor of each node while proceeding back through a branch using the previous node pointer. For example, fourth family object 128, which is associated with sixth node 142, provides a quality factor of 80% when writing the format Z, second family object 124, which is associated with fifth node 140, includes a quality factor of 70% when writing the format H, and first family object 122, which is associated with first node 132, includes a quality factor of 75% when writing the format C. Thus, the branch quality factor for the successful branch including first node 132, fifth node 140, and sixth node 142 is equivalent to 42%.

The determine-the-best-branch process continues at sixth node 142 and proceeds, using the next node pointers, to the next node that can successfully write the output format Z. As a result, fourth node 138 is located and the branch quality factor is calculated for the branch that includes fourth node 138 and first node 132. The branch quality factor for this branch equals 57%. The determine-the-best-branch process continues until second node 134 is located. Second node 134 is a successful branch that includes only one node. The corresponding branch quality factor is equal to 60%. Thus, as illustrated, the best branch will be the successful branch defined by second node 134 since its quality factor is greater than the quality factor of all of the other successful branches. The information corresponding to the location of the best branch and the required format translations and family translator libraries is provided to a separate routine so that the actual input file can be converted using the translators and formats defined by the best branch.

At this point, the fully constructed tree in memory may be removed using the cut-down-tree process. The cut-down-tree process includes locating the root node and saving the next node pointer. The memory associated with the root node is then discarded and the node located at the address of the next node pointer is found and the next node pointer of this node is then stored. The memory associated with this node is then discarded. This proceeds until the last node in the tree is located and discarded.

Thus, it is apparent that there has been provided, in accordance with the present invention, a system and method for controlling the conversion of a file from an input format to an output format that satisfy the advantages set forth above. Although the preferred embodiment has been described in detail, it should be understood that various changes, substitutions, and alterations can be made herein without departing from the scope of the present invention. For example, although the present invention has been described and illustrated for controlling the conversion of a graphics file from an input graphic file format to an output graphic file format, the present invention is not limited to only graphic file formats but may be applied to control the conversion of any file format from an input format to an output format. Similarly, the present invention may be implemented on a single-user computer, a multi-user computer, or a computer coupled to a computer network such as a local area network. Also, the circuitry and hardware described and illustrated in the preferred embodiment as discrete or separate devices may be implemented using a plurality of devices without departing from the scope of the present invention. Other examples of changes, substitutions, and alterations are readily ascertainable by one skilled in the art and could be made without departing from the spirit and scope of the present invention as defined by the following claims.

What is claimed is:

1. A computer-implemented method for controlling the conversion of a computer file from an input format to an output format by determining the best path for converting the file from the input format to the output format using family objects, the method comprising the steps of:

receiving the input format and the output format;

generating a node in memory for each family object that can read the input format;

generating successful branches of nodes in memory that include one or more nodes such that each successful branch includes a first node that can read the input format and a last node that can write the output format; and calculating a best path through the successful branches of nodes.

2. The method of claim 1, further comprising the step of:

discarding all nodes from memory after the calculating the best path step.

3. The method of claim 1, further comprising the step of:

storing a root node pointer indicating the location of the first node generated by the generating a node in memory step.

4. The method of claim 1, further comprising the step of:

storing the best path in memory.

5. The method of claim 1, wherein the generating a node in memory step includes the following steps:

locating a family object that can read the input format;

allocating a portion of memory for the generated node;

storing a pointer to the located family object in the portion of memory for the generated node;

determining if the located family object can write the output format and storing the result in the portion of memory for the generated node;

storing the input format in the portion of memory for the generated node;

storing a next node pointer to the generated node in the portion of memory for the previously generated node; and proceeding back to the locating a family object step until all other family objects, that have not already been checked, have been located.

6. The method of claim 5, wherein the allocating a portion of memory step includes providing the portion of memory as a data structure that includes a family object pointer portion, a next node pointer portion, a previous node pointer portion, a depth of tree portion, a common file format portion, and a done portion.

7. The method of claim 5, wherein the generating successful branches of nodes in memory step includes the following steps to generate a branch:

locating a node generated in the generating a node in memory step that cannot write the output format;

locating a family object that is not already associated with a node in the branch and that can read a format that can be written by the family object associated with the located node;

generating a new node in memory corresponding to the located family object; and proceeding back to the locating a family object step until all other family objects, that are not already associated with a node in the branch and that can read a format that can be written by the family object associated with the located node, have been located.

8. The method of claim 7, wherein the generating a new node in memory step includes the following steps:

allocating a portion of memory for the new node;

storing a pointer to the located family object in the portion of memory for the new node;

storing a next node pointer in the portion of memory for the new node that corresponds to the next node pointer stored in the portion of memory for the located node;

storing a next node pointer in the portion of memory for the located node that corresponds to the address for the new node in memory;

storing a previous node pointer to the located node in the portion of memory for the new node;

storing the format that can be read by the located family object in the portion of memory for the new node; and determining if the located family object can write the output format and storing the result in the portion of memory for the new node.

9. The method of claim 8, further comprising the steps of:

locating a next node defined by the next node pointer in the portion of memory for the located node;

defining the next node as the located node;

determining if the located node can write the output format and proceeding back to the locating a next node step if the located node can write the output format; and proceeding back to the locating a family object step.

10. The method of claim 1, wherein the first node generated in the generating a node in memory step is defined as the root node, and wherein the calculating a best path step includes the following steps:

locating the root node;

moving forward through a successful branch using pointers stored in memory until locate a node that can write the output format;

storing a pointer to the located node;

generating the branch quality factor by multiplying a quality factor associated with all nodes in the successful branch;

comparing the branch quality factor to the best branch quality factor generated previously;

storing the branch quality factor and the pointer to the located node if the branch quality factor is better than the best branch quality factor generated previously; and proceeding back to the moving forward through a successful branch step unless there are no forward nodes.

11. The method of claim 10, wherein the quality factor associated with each node is stored in the family object associated with the node.

12. The method of claim 1, wherein each portion of memory associated with each node includes a next node pointer to a location in memory of the next node so that a contiguous forward link is provided from the first node generated in the generating a node in memory step to the last node of the last branch.

13. The method of claim 12, further comprising the step of discarding all nodes from memory using the contiguous forward link after the calculating the best path step.

14. The method of claim 12, wherein the portion of memory associated with each node includes a previous node pointer to the location of the previous node in a branch so that a backward link is provided for each branch.

15. The method of claim 14, wherein the calculating a best path step includes using the contiguous forward link and the backward link to traverse each branch.

16. The method of claim 1, wherein the computer file is a graphics file.

17. A computer readable memory comprising:
a computer-readable medium; and
a computer program encoded on the computer-readable medium for enabling a computer to control the conversion of a computer file from an input format to an output format by determining the best path for converting the file from the input format to the output format using family objects, the computer program comprising:
computer implemented instructions to receive and store the input format and the output format;
computer implemented instructions to generate a node in a computer system memory corresponding to each family object that can read the input format;
computer implemented instructions to generate successful branches of nodes in the computer system memory that include one or more nodes such that each successful branch includes a first node that can read the input format and a last node that can write the output format; and
computer implemented instructions to calculate a best path through the successful branches of nodes.

18. The computer readable memory of claim 17, wherein the computer program further includes:
computer implemented instructions to discard all nodes from the computer system memory after calculating the best path.

19. The computer readable memory of claim 17, wherein the computer implemented instructions to generate a node of the computer program further includes:
computer implemented instructions to locate a family object that can read the input format;
computer implemented instructions to allocate a portion of the computer system memory for the generated node;
computer implemented instructions to store a pointer to the located family object in the portion of the computer system memory for the generated node;
computer implemented instructions to determine if the located family object can write the output format and to store the result in the portion of computer system memory for the generated node;
computer implemented instructions to store the input format in the portion of computer system memory for the generated node;
computer implemented instructions to store a next node pointer to the generated node in the portion of computer system memory for the previously generated node; and
computer implemented instructions to proceed back to the computer implemented instructions to locate a family until all other family objects, that have not already been checked, have been located.

20. The computer readable memory of claim 17, wherein the computer program further includes:
computer implemented instructions to ensure that each portion of the computer system memory for each node includes a next node pointer to a location in the computer system memory of the next node so that a contiguous forward link is provided from the first node to the last node of the last branch.

21. The computer readable memory of claim 20, wherein the computer implemented instructions to ensure that each portion of the computer system memory for each node includes a next node pointer also ensures that the portion of computer system memory associated with each node includes a previous node pointer to the location of the previous node in a branch so that a backward link is provided for each branch.

22. A technology routing system using a computer to control the conversion of a computer file from an input format to an output format by determining the best path for converting the file from the input format to the output format using family objects, the system comprising:
a computer-readable medium;
a computer program encoded on the computer-readable medium; and
a processor responsive to the computer-readable medium as configured by the computer program to:
receive the input format and the output format;
generate a node in a memory of the computer for each family object that can read the input format;
generate successful branches of nodes in the memory of the computer that include one or more nodes such that each successful branch includes a first node that can read the input format and a last node that can write the output format; and
calculate a best path through the successful branches of nodes.

23. The system of claim 22, wherein the processor is responsive to generate a node in a memory of the computer for each family object that can read the input format, by being responsive to:
locate a family object that can read the input format;
allocate a portion of the memory of the computer for the generated node;
store a pointer to the located family object in the portion of the memory of the computer for the generated node;
determine if the located family object can write the output format and storing the result in the portion of memory of the computer for the generated node;
store the input format in the portion of memory of the computer for the generated node;
store a next node pointer to the generated node in the portion of memory of the computer for the previously generated node; and
proceed back to the locate a family object that can read the input format responsive step until all other family objects, that have not already been checked, have been located.

24. The system of claim 23, wherein the processor is responsive to generate successful branches of nodes in the memory of the computer that include one or more nodes such that each successful branch includes a first node that can read the input format and a last node that can write the output format, by being responsive to:
locate a node in the memory of the computer that includes a family object that can read the input format but cannot write the output format;
locate all family objects that are not already associated with a node in the branch and that can read a format that can be written by the family object associated with the located node; and
generate a new node in the memory of the computer corresponding to each of the located family objects.

25. The system of claim 22, wherein the computer file is a graphics file.

* * * * *